United States Patent
Dejewski et al.

(10) Patent No.: US 11,295,405 B2
(45) Date of Patent: Apr. 5, 2022

(54) COGNITIVE RECOMMENDATIONS FOR FIRST RESPONDERS

(71) Applicant: International Business Machines Corporation, Armonk, NY (US)

(72) Inventors: Donald P. Dejewski, North Massapequa, NY (US); Romelia H. Flores, Keller, TX (US); David L. Jenkins, Gettysburg, PA (US); Hong S. Kim, Bethesda, MD (US); Jeffrey L. Tennenbaum, Dunn Loring, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 998 days.

(21) Appl. No.: 15/363,575

(22) Filed: Nov. 29, 2016

(65) Prior Publication Data
US 2018/0150928 A1 May 31, 2018

(51) Int. Cl.
*G06Q 10/06* (2012.01)
*G06Q 50/26* (2012.01)
*G06Q 50/00* (2012.01)

(52) U.S. Cl.
CPC ..... *G06Q 50/265* (2013.01); *G06Q 10/06315* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 6,112,075 | A | 8/2000 | Weiser |
| 8,274,377 | B2 | 9/2012 | Smith et al. |
| 9,153,117 | B2 | 10/2015 | Sennett et al. |
| 2007/0105578 | A1 | 5/2007 | Shaffer et al. |
| 2009/0287497 | A1 | 11/2009 | Brown |
| 2010/0280836 | A1 | 11/2010 | Lu et al. |
| 2010/0315228 | A1 | 12/2010 | Grilliot et al. |
| 2012/0256745 | A1* | 10/2012 | Piett ............... G06Q 30/02 340/540 |

(Continued)

FOREIGN PATENT DOCUMENTS

| | | | | |
|---|---|---|---|---|
| CA | 3031040 | A1 * | 1/2017 | ......... A63B 24/0003 |
| WO | 2008048273 | A2 | 4/2008 | |
| WO | 2015184255 | A1 | 12/2015 | |

OTHER PUBLICATIONS

Ailish Valeriano et al, "Crowdsourcing to save lives: A scoping review of bystander alert technologies for out-of-hospital cardiac arrest," 2021, Resuscitation Journal, vol. 158, pp. 94-121 (Year: 2021).*

(Continued)

*Primary Examiner* — Amanda Gurski
(74) *Attorney, Agent, or Firm* — Cuenot, Forsythe & Kim, LLC

(57) ABSTRACT

Providing recommendations for first responders can include receiving, using a processor, real time sensor data from a plurality of sensors, correlating, using the processor, the real time sensor data with historical data for a plurality of prior incidents to determine a selected prior incident matching the real time sensor data, and determining a recommended next action from an operating procedure based upon a next action taken for the selected prior incident.

18 Claims, 3 Drawing Sheets

(56) References Cited

U.S. PATENT DOCUMENTS

| | | | |
|---|---|---|---|
| 2014/0155018 A1* | 6/2014 | Fan | H04W 72/048 |
| | | | 455/404.1 |
| 2014/0218515 A1 | 8/2014 | Armendariz et al. | |
| 2015/0230072 A1 | 8/2015 | Saigh et al. | |
| 2016/0036899 A1 | 2/2016 | Moody et al. | |
| 2016/0163186 A1 | 6/2016 | Davidson et al. | |
| 2016/0337829 A1* | 11/2016 | Fletcher | H04W 12/06 |
| 2017/0185721 A1* | 6/2017 | Schuck | G16H 40/20 |
| 2018/0336413 A1* | 11/2018 | Zhao | G06Q 50/265 |

OTHER PUBLICATIONS

Chikara Yonekawa et al, "Development of a first-responder dispatch system using a smartphone," 2014, Journal of Telemedicine and Telecare, vol. 20(2), pp. 75-81 (Year: 2014).*

Kumar et al., "Robot and Sensor Networks for First Responders," IEEE Pervasive Computing, vol. 3, No. 4, pp. 24-33, Oct.-Dec. 2004.

* cited by examiner

COGNITIVE RECOMMENDATIONS FOR FIRST RESPONDERS

BACKGROUND

This disclosure relates to cognitive computing and, more particularly, to using cognitive computing to provide recommendations to first responders.

Mobile applications are being developed at a rapid pace. Despite this boom in development, first responder applications have only recently started to emerge. As such, availability of mobile applications for first responders is limited. Further, the mobile applications that are available for first responders tend to have a narrow set of capabilities.

As an illustrative example, some first responder systems have begun incorporating sensor technology. A first responder such as a fire fighter may be equipped with a mobile device executing a first responder mobile application. While the mobile device provides the first responder with additional information not otherwise available, in many cases, the information provided through the mobile device is limited to displaying raw sensor data. The mobile device operates largely as a display for the transmitted sensor data.

SUMMARY

One or more embodiments are directed to methods of providing recommendations for first responders. In one aspect, a method can include receiving, using a processor, real time sensor data from a plurality of sensors, correlating, using the processor, the real time sensor data with historical data for a plurality of prior incidents to determine a selected prior incident matching the real time sensor data, and determining a recommended next action from an operating procedure based upon a next action taken for the selected prior incident.

One or more embodiments are directed to systems for providing recommendations for first responders. In one aspect, a system includes a processor configured to initiate executable operations. The executable operations can include receiving real time sensor data from a plurality of sensors, correlating the real time sensor data with historical data for a plurality of prior incidents to determine a selected prior incident matching the real time sensor data, and determining a recommended next action from an operating procedure based upon a next action taken for the selected prior incident.

One or more embodiments are directed to a computer program product for providing recommendations for first responders. In one aspect, the computer program product includes a computer readable storage medium having program code stored thereon. The program code is executable by a processor to perform a method. The method can include receiving, using the processor, real time sensor data from a plurality of sensors, correlating, using the processor, the real time sensor data with historical data for a plurality of prior incidents to determine a selected prior incident matching the real time sensor data, and determining a recommended next action from an operating procedure based upon a next action taken for the selected prior incident.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to cognitive computing and, more particularly, to using cognitive computing to provide recommendations to first responders. One or more embodiments described within this disclosure are directed to methods, systems, and computer program products capable of performing cognitive computing operations to generate recommendations that can be provided to first responders. A system, for example, is capable of analyzing a variety of different data sources. These data sources can include real time sensor data and historical data for prior incidents. The system is capable of using machine learning techniques to provide real time situational awareness and/or recommendations to first responders based on the data sources.

The recommendations, which the system is capable of automatically generating, demonstrate an understanding of the particular conditions and/or circumstances that are occurring. As such, the recommendations may vary in scope. For example, some recommendations predict that an incident is likely to occur so that resources may be dispatched. Other recommendations may be to dispatch resources of a particular type and/or a particular amount. The system is capable of updating and/or adjusting recommendations in real time in response to the data sources that are analyzed.

Further aspects of the embodiments described within this disclosure are described in greater detail below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
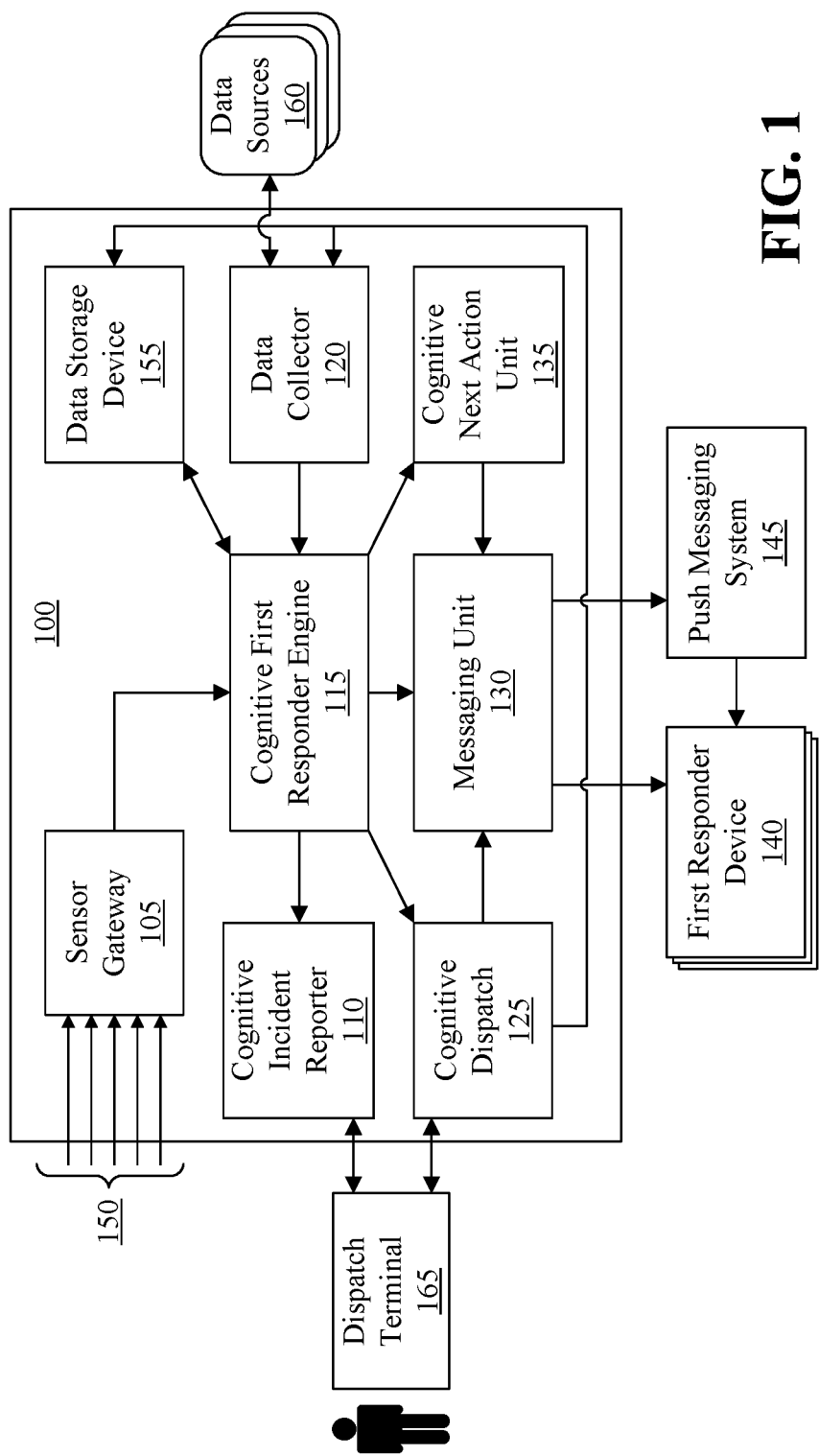
FIG. 1 illustrates an example of a first response cognitive computing system.

FIG. 1 illustrates an example of a first response cognitive computing system (system) 100. System 100 includes a plurality of different processing nodes. In an embodiment, the processing nodes are implemented as a plurality of interconnected data processing systems. In one example, each processing node is implemented in a different data processing system. In another example, two or more processing nodes may be combined and implemented in a same data processing system.

In an embodiment, system 100 includes the following processing nodes: a sensor gateway 105, a cognitive incident reporter 110, a cognitive first responder engine (cognitive engine) 115, a data collector 120, a cognitive dispatch 125, a messaging unit 130, and a cognitive next action unit 135. As pictured, messaging unit 130 may be coupled to one or more first responder devices 140 and/or to a push messaging system 145. In one aspect, system 100 is adapted to leverage data from a variety of external data sources 160 and present information to dispatch terminal 165. In addition, system 100 may include a data storage device 155 such as an additional data processing system, a network accessible storage device, etc.

Sensor gateway 105 is configured to operate as an interface between one or more sensors providing sensor data 150 via the signals shown and cognitive engine 115. In one aspect, sensor data 150 is real time sensor data. Examples of sensor data that may be received include, but are not limited to, temperature, radiation level, carbon dioxide level, smoke present or detected, and so forth. Sensor data may also include weather data such as outside temperature, wind speed, wind direction, humidity, fire hydrant sensor data, and so forth. In one aspect, sensor gateway 105 is configured to receive sensor data 150. Sensor data 150 may be received via any of a variety of communications protocols. Examples of such communications protocols include, but are not limited to, MQ Telemetry Transport (MQTT) queues, general-purpose input/output (GPIO), REST API, and so forth. Sensor gateway 105, for example, is capable of aggregating received sensor data 150 and providing the sensor data 150 to cognitive engine 115 for processing.

Data collector 120 is capable of retrieving relevant data from one or more additional data sources 160. Examples of data sources 160 can include, but are not limited to, first responder personnel systems, historical response incident records, first responder inventory systems, incident resources systems, weather services, social networking platforms, traffic cameras, hospital data feeds, fire inspection records, etc. In an embodiment, data collector 120 is capable of retrieving additional data in response to a request to do so from cognitive engine 115. In another embodiment, data collector 120 is capable of retrieving additional data in response to creation of an incident. In an example implementation, data collector 120 is capable of requesting additional information based upon a universal resource locator (URL) that is specific to a data type. A callback from the data type request is used to send updates back to data collector 120.

The term "incident," as used herein, means an occurrence of a situation or condition that requires dispatch of resources such as personnel in the form of first responders, natural resources, food, shelter, and/or equipment. An "incident" refers to the formalization of conditions requiring resources as implemented or stored as a data structure within one or more processing nodes of system 100, e.g., data storage device 155.

In an embodiment, in response to the creation of an incident, whether performed in an automated manner by system 100 as described herein or initiated by a dispatcher (e.g., a human being), cognitive engine 115 determines a type of incident and notifies data collector 120 about the incident. In an aspect, the type of the incident may be specified as part of the incident data structure in system 100. Example incident types can include, but are not limited to, fire, auto accident, flood, hazmat, etc. In response, data collector 120 is capable of retrieving data from additional data sources 160. Thus, data collector 120 is capable of retrieving additional data based upon the incident. For example, data collector 120 is capable of retrieving additional data based upon the type of the incident, e.g., fire, accident, flood, hazmat, etc. In another example, data collector 120 is capable of retrieving additional data based upon severity and/or location of the incident.

As noted, data collector 120 is capable of retrieving particular data types and/or subsets of the particular data types based upon the type of incident that is detected. As an illustrative example, data collector 120, in response to detecting a particular type of incident such as a fire, may retrieve social networking platform posts relating to "fire" or another keyword associated with "fire." Further, in the event that a location or region for the fire incident is known, data collector 120 is capable of searching for geographically relevant posts that mention fire or smoke such as posts that originate from a location that is within a predetermined distance of the location of the fire incident.

In FIG. 1, a social networking platform (as may be represented by data source 160, for example) may be implemented as one or more interconnected computer systems, e.g., servers. As defined herein, a "social networking platform" is a computing platform that allows users to build social networks or social relations among people who share similar interests, activities, backgrounds or real-life connections. Through a social networking platform, users may send communications through different mechanisms such as by posting messages or other media, commenting on messages, posts, or other media, replying to messages, and performing other operations such as "liking" a communication or item of media, sharing the communication or item of media, expressing an emotional sentiment, and so forth. In the context of a social networking platform, actions such as posting, replying, liking, sharing, expressing sentiment, and so forth are programmatic actions that are monitored and persisted within the social networking platform, e.g., within a data storage device in a data structure within and/or accessible by, the social networking platform.

In another embodiment, data collector 120 is capable of using Natural Language Processing (NLP) technology to extract events indicating meaning from social networking platform feeds, other media feeds, call transcripts, or other textual data. NLP is a field of computer science, artificial intelligence, and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, and quantification information, such as cardinality, iteration, and dependency. Data collector 120 is capable of providing extracted events and/or data to cognitive engine 115.

In another embodiment, data collector 120 is capable of using image processing techniques to received images and/or video to extract data and/or events from the received visual data that are provided to cognitive engine 115. In still another embodiment, data collector 120 is capable of performing speech recognition to convert speech received as audio into text that may then be analyzed using NLP techniques to extract data and/or events that are provided to cognitive engine 115.

In one aspect, cognitive engine 115 is implemented as an analytics processor. Cognitive engine 115 is capable of analyzing data for a current situation or an ongoing incident. A current situation refers to set of conditions observed from sensor data 150 and/or from additional data retrieved from data sources 160 that may evolve into an incident. Cognitive engine 115 is capable of analyzing data for a current situation and/or an incident and distribute events specifying an interpretation of the processed data to the other processing nodes of system 100.

For example, cognitive engine 115 is capable of analyzing real time sensor data and data received from data collector 120 to detect events within the data. As an illustrative example, cognitive engine 115 may receive weather data and/or other sensor data and generate events indicating whether the sensor data is normal, above normal, below normal, increasing, or decreasing. For example, cognitive engine 115 is capable of generating events indicating whether rain is present or generate events indicating whether the temperature is "high," "low," "increasing," "decreasing," etc. Similarly, cognitive engine 115 may generate events indicating whether radiation and/or carbon dioxide levels are high, increasing, decreasing, etc. These events, which may indicate the crossing of thresholds, trends, and the like, are distributed to the other processing nodes of system 100.

In another illustrative example, cognitive engine 115 is capable of comparing sensor data 150, e.g., real time sensor data and/or other current data from data sources 160, with historical data for prior incidents. Cognitive engine 115, for example, may compare current data with data for prior incidents to determine which items match and which do not. Prior incidents are incidents occurring in the past for which resource(s) were dispatched. Cognitive engine 115 is capable of providing results of the comparison(s) to the various other processing nodes of system 100 in the form of events.

Cognitive next action unit 135 is capable of determining an appropriate next action for an incident. Cognitive next action unit 135 is capable of determining next actions based upon data received from cognitive engine 115 in the form of events. The events may include processed sensor data and events relating to weather, social media, and so forth as generated from the data obtained from data collector 120. The events may also include events generated from comparisons of current data with prior incident data.

Cognitive next action unit 135 is capable of evaluating events from cognitive engine 115 relating to the comparison of data for an incident, e.g., a current or ongoing incident, with data for one or more prior incidents. As an illustrative example, cognitive next action unit 135 is capable of determining, from the events, that weather conditions and sensor data from different prior incidents are similar to the data for a current incident. In this regard, cognitive next action 135 is capable of determining that a current fire incident is unlike a prior fire incident since rain occurred during the prior fire incident and no rain is currently falling for the current fire incident.

Based upon the comparison, cognitive next action unit 135 is configured to recommend one or more next actions such as, for example, one or more emergency management processes. As such, the next action that is recommended by cognitive next action unit 135 is not based upon referring to a static set of rules, but rather accounts for real time sensor data, weather data, and historical data for incidents.

As an illustrative example, in the case of a fire incident where personnel is dispatched, cognitive next action unit 135 is capable of determining an estimate of the amount of water required to control and/or extinguish the fire based upon data indicating smoke levels and/or carbon dioxide levels as received from cognitive engine 115. In another example, cognitive next action unit 135 is capable of indicating that particular regions, e.g., geographic areas, should be approached with caution or not at all without heavy water resources and/or additional personnel in response to determining that signals from particular sensor(s) are no longer being received indicating that the sensors in the region(s) are likely damaged by the fire. Such sensors, prior to no longer sending data, may have sent data indicative of a fire, e.g., rising temperature readings, rising smoke levels, etc.

In another illustrative example, cognitive next action unit 135 receives geographic information system (GIS) data events, temperature events, smoke events, and weather events comparing such information for a current incident and with data for prior incidents. The information for prior incidents may indicate that past incidents with rain, high winds, and high temperature caused dispatches of multiple units requiring increased personnel. In prior incidents where no rain was present, a dispatch of one unit was sufficient. Accordingly, cognitive next action unit 135 is capable of determining whether the current incident involves "rain," "high wind," "high temperature," and provide a recommendation as to the amount of resources, e.g., the number of units needed, based upon similarity of the current incident to the prior incidents.

Cognitive incident reporter 110 is configured to proactively notify a dispatcher of incidents that may occur and/or are likely to occur in the future based upon data received from cognitive engine 115. In performing the notification operation(s) for future incidents, cognitive incident reporter 110 may display sensor data, data obtained from data sources 160 as described herein, and/or historical data for prior incidents. In one or more embodiments, rather than wait for an emergency to occur, cognitive incident reporter 110 is capable of initiating and/or recommending dispatch of a preliminary first responder team.

For example, cognitive incident reporter 110 is capable of notifying a dispatcher that an incident is likely to occur in the near future. Cognitive incident reporter 110 may display data, e.g., sensor data and/or data from data sources 160, which matches data for one or more prior incidents. Cognitive incident reporter 110 may also display the prediction of the occurrence of an incident similar to, or the same as, a prior incident corresponding to the matched data that is currently available. Cognitive incident reporter 110 is capable of displaying information to notify dispatch terminal 165 and/or generate and flow messages to cognitive dispatch 125. Dispatch terminal 165 (e.g., a manual system with a user acting as a dispatcher) and/or cognitive dispatch 125 is capable of dispatching a preliminary first responder team. For example, dispatch terminal 165 and/or cognitive dispatch 125 is capable of dispatching a team through messaging unit 130, which triggers push messaging system 145 and first responder device(s) 140. The preliminary first responder team, for example, may be a team in training. In another example, cognitive incident reporter 110 is capable of indicating the need to initiate the dispatch of personnel in response to one or more sensors generating sensor values that surpass a threshold sensor level as determined from data received from cognitive engine 115.

In another embodiment, cognitive incident reporter 110 is capable of operating as a primary interface for dispatch personnel. Working through dispatch terminal 165 coupled to cognitive incident reporter 110, for example, a dispatcher is capable of creating an incident. Similarly, working through dispatch terminal 165 coupled to cognitive dispatch 125, a dispatcher is capable of assigning resources to the incident (e.g., dispatching resources for the incident).

Cognitive dispatch 125 is configured to automatically dispatch and/or recommend appropriate resources for an incident based on sensor data, additional data from data sources 160, and/or historical incident data. In this example, the term "resources" refers to personnel and/or equipment. If, for example, a hazmat sensor is triggered and cognitive engine 115 provides such an event to cognitive dispatch 125, cognitive dispatch 125 is capable of automatically dispatching a hazmat team. In another example, where cognitive engine 115 provides weather events to cognitive dispatch 125 in relation to a particular incident, cognitive dispatch 125 is capable of dispatching the resources to a particular location that is determined based upon possible exposure of the hazmat team to hazardous conditions (e.g., including location) and current weather conditions, e.g., wind speed and/or wind direction, rain, etc.

In still another embodiment, cognitive dispatch 125 is configured to initiate new incidents within system 100. As such, cognitive dispatch 125 is capable of initiating execution of additional data collection, integration, and/or analytical services in system 100 whether by operation of a dispatcher or as automatically generated by cognitive dispatch 125. For example, cognitive incident reporter 110 is capable of instructing cognitive engine 115 to trigger data collector 120 to begin collecting data from data sources 160 in response to the creation of an incident. Cognitive engine 115 determines an appropriate action based on input from data collector 120 and cognitive next action unit 135. Cognitive dispatch 125, by way of events relating to the appropriate action received from cognitive engine 115, is capable of instructing messaging unit 130 of a particular location and/or region to which resources should be dispatched. Data collector 120 may use the location information to filter data such as weather and/or social networking platform data for the location or region of interest. In another example, cognitive dispatch 125 is capable of generating records of incidents in data storage device 155, thereby allowing cognitive engine 115 to detect the incident for which resources have been dispatched and continue generating events relating to the incident.

In one aspect, cognitive engine 115 is capable of generating an event or events indicating the occurrence of an incident for which resources have been dispatched that may be distributed to messaging unit 130 and/or cognitive next action unit 135. Cognitive engine 115 is further capable of providing events for the incident to cognitive dispatch 125 so that cognitive dispatch 125 may update dispatching by assigning more resources, reducing resources, etc., for the incident. For example, cognitive dispatch 125 may receive events specifying assigned resources for one or more prior incidents found to match the current incident from cognitive engine 115. Cognitive dispatch 125 is capable of increasing or decreasing the amount of resources dispatched for a current incident, changing the type of resources dispatched for the current incident, and the like based upon a comparison of currently dispatched resources with the resources dispatched for matching prior incidents.

Messaging unit 130 is configured to broker messages between system 100 and first responder devices 140, e.g., first responder applications executing on the first responder devices 140. In an embodiment, messaging unit 130 is capable of providing role-based access to messaging queues utilized within system 100. For example, messaging unit 130 may provide first responder devices 140 with access to an incident queue maintained by cognitive engine 115 for storing active incidents. As such, the particular messages that a given first responder device 140 (and thus first responder) is able to access are dependent upon the role of that first responder.

Messaging unit 130 is also capable of accessing one or more push messaging systems 145. For example, numerous device providers and/or wireless service providers provide push messaging systems. Entities may access the push messaging systems in order to push messages to a defined subscriber base. Messaging unit 130 is capable of providing messages to push messaging system 145 for distribution to one or more devices such as, for example, first responder device(s) 140.

Data storage device 155 may store a variety of different information utilized by cognitive engine 115. In an embodiment, data storage device 155 stores operating procedure documents. Operating procedure documents may be stored as data structures that are usable by cognitive engine 115. For example, the operating procedure document(s) may be standard operating procedure documents for an organization, for a facility, etc. An operating procedure document, for example, may specify various events detectable from real time sensor data and/or events determined from data sources 160. The events may be correlated or associated with one or more potential actions that may be taken and recommended as defined within the operating procedure document(s). In this regard, cognitive engine 115 is capable of comparing events determined from real time sensor data and data sources 160 with events in the operating procedure document(s) to determine one or more potential actions that may be taken in accordance with the operating procedure document(s).

In an embodiment, cognitive engine 115 is capable of providing events specifying the potential actions to cognitive next action unit 135 for selecting a particular one of the potential actions as a next action as previously described. For example, cognitive engine 115 is capable of providing potential actions of A, B, and C, e.g., candidate next actions, to cognitive next action unit 135 along with other events that may include sensor data 150, data from data sources 160, and/or events indicating prior actions taken in matching prior incidents. Cognitive next action unit 135 is capable of selecting action A, B, and/or C based upon a comparison of the actions taken in prior incidents. For example, in response to cognitive next action unit 135 determining that events for the current incident match a prior incident for which action B was performed, cognitive next action unit 135 may select action B as the recommended next action from the candidate next actions and may include one or more or all of the candidate next actions A, B, and C as acceptable options per the operating procedure document(s).

In one or more embodiments, processing nodes such as cognitive incident reporter 110, cognitive engine 115, cognitive dispatch 125, and cognitive next action unit 135 are adapted to utilize one or more computational and/or machine learning techniques (hereafter "techniques") for performing the operations described herein. Example techniques may include, but are not limited to, classification algorithms, entity recognition, NLP, deep learning, and/or artificial neural networks.

Figure 2:
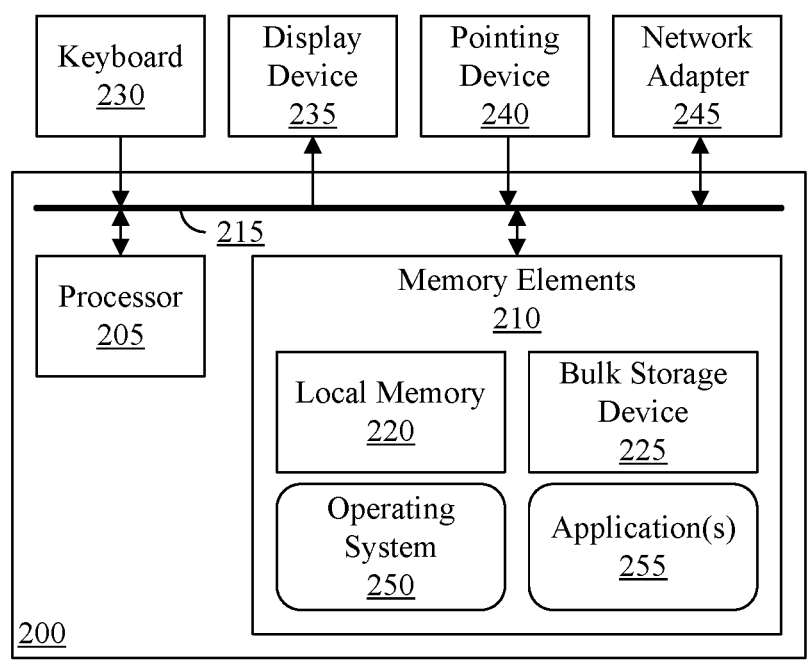
FIG. 2 illustrates an example of a data processing system.

FIG. 2 illustrates an example data processing system (system) 200. System 200 includes at least one processor 205 coupled to memory elements 210 through interface circuitry 215. Examples of interface circuitry 215 can include, but are not limited to, a bus interface, a memory interface, an input/output (I/O) system, and so forth. System 200 stores program code within memory elements 210. Processor 205 executes the program code accessed from memory elements 210 via interface circuitry 215.

Memory elements 210 include one or more physical memory devices such as, for example, a local memory 220 and one or more bulk storage devices 225. Local memory 220 refers to random access memory (RAM) or other non-persistent memory device(s) generally used during actual execution of the program code. Bulk storage device 225 may be implemented as a hard disk drive (HDD), solid state drive (SSD), or other persistent data storage device. System 200 may also include one or more cache memories (not shown) that provide temporary storage of at least some program code in order to reduce the number of times program code must be retrieved from bulk storage device 225 during execution.

I/O devices such as a keyboard 230, a display device 235, and/or a pointing device 240 may optionally be coupled to system 200. The I/O devices may be coupled to system 200 either directly or through intervening I/O controllers. A network adapter 245 may also be coupled to system 200 to enable system 200 to become coupled to other systems, computer systems, remote printers, and/or remote storage devices through intervening private or public networks. Network adapter 245 may be coupled to system 200 either directly or through an intervening I/O controller. Modems, Ethernet cards, and wireless transceivers are examples of different types of network adapter 245 that may be used with system 200.

As pictured in FIG. 2, memory elements 210 store an operating system 250 and one or more application 255. Operating system 250 and application(s) 255, being implemented in the form of executable program code, are executed by system 200. As such, operating system 250 and/or application 255 are considered an integrated part of system 200. Operating system 250, application 255, and any data used, generated, and/or operated upon by system 200 are functional data structures that impart functionality when employed as part of system 200. A "data structure" refers to a physical implementation of a data model's organization of data within a physical memory. As such, a data structure is formed of specific electrical or magnetic structural elements in a memory. A data structure imposes physical organization on the data stored in the memory as used by program code (e.g., operating system 250 and/or application 255) as executed using processor 205.

In one or more embodiments, system 200 is implemented as a cloud computing node. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

In one or more embodiments, system 200 is implemented as a computer or other data processing system that is suitable for storing and/or executing program code. In one example, system 200 is implemented as a server. It should be appreciated, however, that system 200 can be implemented in the form of any system including a processor and memory that is capable of performing the functions described within this disclosure.

In this regard, system 200 may include fewer components than shown or additional components not illustrated in FIG. 2 depending upon the particular type of system that is implemented. In addition, the particular operating system and/or application(s) included may vary according to type of system as may the types of network adapter(s) included. Further, one or more of the illustrative components may be incorporated into, or otherwise form a portion of, another component. For example, a processor may include at least some memory.

In one or more embodiments, each of the blocks described with reference to FIG. 1 is implemented as a data processing system. In one or more embodiments, two or more of the blocks described with reference to FIG. 1 are implemented in a same data processing system. In any case, the data processing systems may be communicatively linked through direct connections (e.g., peer-to-peer) or through a network.

Figure 3:
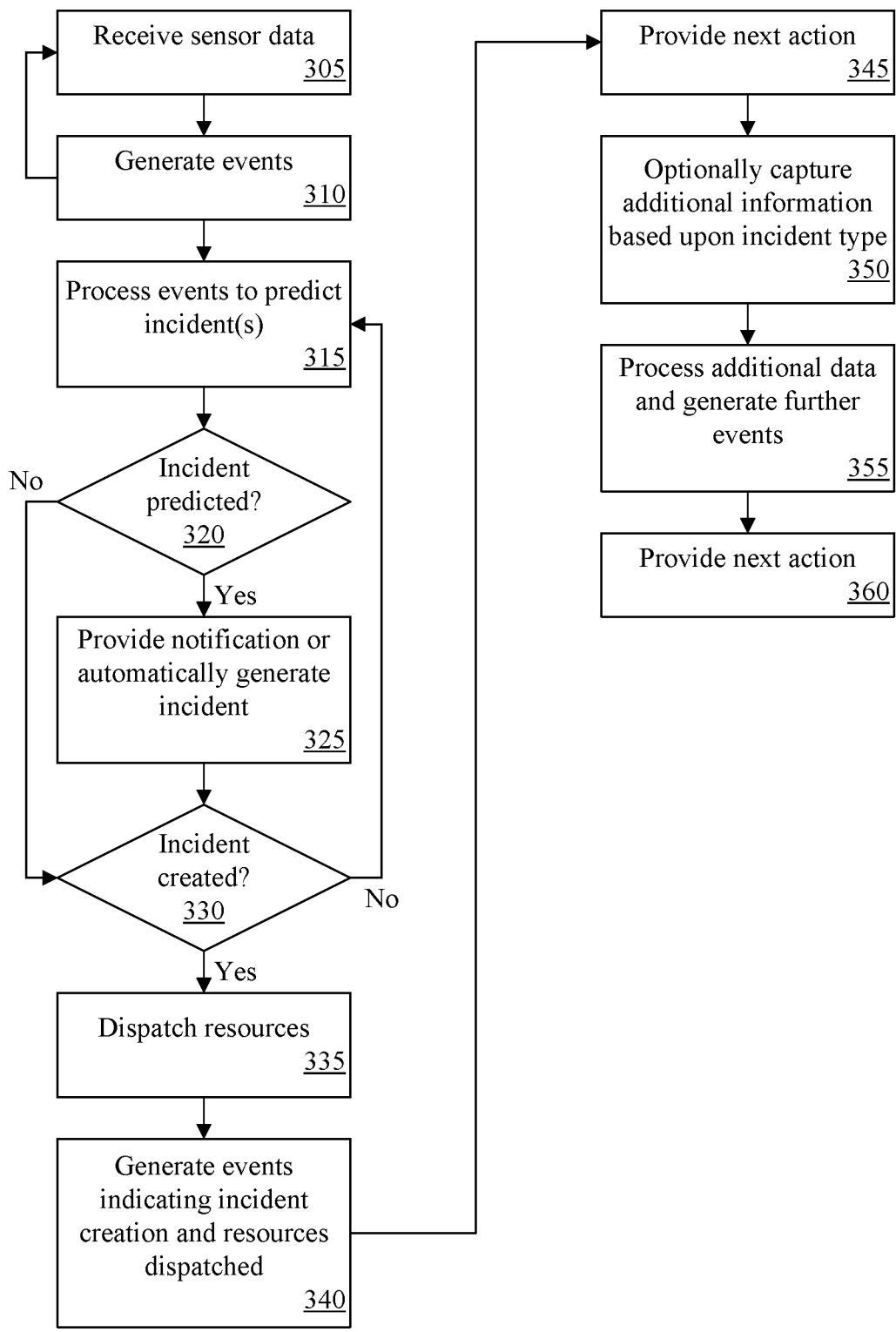
FIG. 3 is a flow chart illustrating an example method of generating recommendations using cognitive computing.

FIG. 3 is a flow chart illustrating an example method 300 of generating recommendations using cognitive computing. In an embodiment, a system such as system 100 of FIG. 1 is capable of performing method 300. Method 300 illustrates various operations performed by the processing nodes of a system such as system 100 of FIG. 1 in an example context. A system such as system 100 of FIG. 1 is capable of operating in a dynamic manner responsive to data received in real time. As such, it should be appreciated that method 300 is provided for purposes of illustration and not limitation. For example, the particular operations performed, interaction of processing nodes, and/or order of blocks described with reference to FIG. 3 is not to be construed as limiting of the various embodiments described herein.

Method 300 can begin in block 305 where the system receives sensor data. The sensor data may be real time sensor data. For example, sensor gateway 105 receives sensor data from a plurality of different sensors. In block 310, the system generates events based upon the received sensor data. For example, cognitive engine 115 is capable of analyzing the sensor data and generating one or more events from the sensor data. Cognitive engine 115 is capable of distributing the events among the other processing nodes of the system. For purposes of illustration of the real time operational aspects of system 100, block 310 includes a path back to block 305. The loop back from block 310 to block 305 illustrates that real time sensor data may be continually received and processed by cognitive engine 115.

In block 315, the system optionally processes the events to predict an incident. For example, cognitive engine 115 is capable of analyzing the events from sensor gateway 105 using the various techniques described herein and predicting whether an incident is likely to occur. In block 320, the system determines whether an incident is predicted. For example, if cognitive engine 115 predicts an incident, method 300 continues to block 325. If cognitive engine 115 does not predict an incident, method 300 can continue to block 330.

In block 325, the system provides a notification of the predicted incident or automatically generates an incident for the predicted incident. In one aspect, for example, cognitive engine 115 triggers cognitive incident reporter 110 to display a notification to a dispatcher, e.g., a user, that an incident is predicted. In that case, the dispatcher may manually create an incident within the system in response to the notification.

In another aspect, for example, cognitive engine 115 triggers cognitive dispatch 125, which is capable of generating an incident automatically.

In block 330, the system determines whether an incident has been created. If so, method 300 continues to block 335. If not, method 300 loops back to block 305 to continue processing. For example, the system may perform a general check as to whether an incident has been created whether automatically as described herein or manually by a dispatcher.

In block 335, the system is capable of automatically dispatching resources for the incident. In one aspect, cognitive dispatch 125 is capable of selecting particular resources and quantities of resources to dispatch. Cognitive dispatch 125, for example, is capable of receiving events from cognitive engine 115 comparing current data with historical incident data. Cognitive dispatch 125 is capable of dispatching resources based upon the received events. In another embodiment, a dispatcher may utilize cognitive dispatch 125 to manually dispatch resources for the incident.

In block 340, the system is capable of generating events indicating creation of the incident and the dispatch of resources. For example, cognitive dispatch 125 is capable of sending messages through messaging unit 130 for distribution to first responders to provide dispatch instructions. Cognitive dispatch 125 is also capable of updating records within data storage device 155 to indicate the dispatch of resources and specify details relating to the incident such as the type of incident, particular resources that have been dispatched, amounts or quantities of the resources, location of the incident, etc.

In block 345, the system is capable of providing one or more next actions. For example, cognitive engine 115 is capable of accessing data storage device 155 to detect the creation of an incident. Cognitive engine 115 further may read records from data storage device 155 to learn the types of resources dispatched and the quantities. Accordingly, cognitive engine 115 is capable of generating further events that are related or correlated with the incident and that may be distributed to cognitive next action unit 135 or other processing nodes such as messaging unit 130 or cognitive dispatch 125. Cognitive next action unit 135 is capable of operating on the events received and determining one or more next actions that may be sent to cognitive engine 115 for consolidation and analytics.

In block 350, the system optionally captures additional information from data sources 160. As discussed, data collector 120 may be instructed to collect additional data in response to an incident being created. Cognitive engine 115, for example, in response to detecting the incident, may instruct data collector 120 to collect and/or provide contextually relevant data from data sources 160. In an embodiment, the data that is collected is based upon the type of the incident. For example, data collector 120 may access weather services, traffic cams, social networking platforms, etc. In one aspect, data collector 120 filters the received data based upon the particular incident type. In another aspect, data collector 120 is capable of generating a request for data that is correlated with the incident created within the system. For example, data collector 120 may formulate a query that may be submitted to social networking platforms for information such as posts that have a geographic point of origin within a predetermined distance of the location of the incident.

In block 355, the system is capable of processing the additional data and generating further events. For example, cognitive engine 115 is capable of receiving data from data collector 120. Cognitive engine 115 is capable of processing the additional data to generate further events that may be distributed throughout the various processing nodes of the system. It should be appreciated that while receiving additional data via data sources 160, cognitive engine 115 may still continue to receive real time sensor data and/or updates as to the current incident in terms of resource dispatch and/or utilization in order to continue making comparisons and generating events. In block 360, the system may generate one or more next actions. For example, cognitive next action unit 135 is capable of receiving the further events generated by cognitive engine 115. Cognitive next action unit 135 is capable of generating one or more additional next actions based upon any additional real time sensor data that is obtained and the additional data retrieved by data collector 120.

The following examples illustrate further capabilities and use cases for system 100.

In one example, the sensor data may include data from a smoke detector, data from a temperature detector, and data from a radiation detector. Cognitive engine 115 is capable of determining that the smoke detector data indicates that smoke is detected. Cognitive engine 115 is further capable of determining that a temperature sensor indicating increasing temperatures is located within a predetermined distance of the smoke detector and that a radiation detector also located within the predetermined distance of the smoke detector is indicating increasing radiation levels. In this case, cognitive engine 115 generates events indicating smoke present, increasing temperature, and increasing radiation for a location or region. Cognitive incident reporter 110, in response to the events, is capable of generating an alert or displaying a predicted incident to dispatch terminal 165 so that the dispatcher may alert personnel and send a proactive response team.

In another example, the system may store past GIS data and past weather conditions associated with an incident. Using a machine learning technique, for example, the system, e.g., cognitive next action unit 135, is capable of learning that in prior incidents involving rain, high winds, and high temperatures, multiple dispatches (e.g., increased personnel) were required. Cognitive next action unit 135 may further learn that in the case where the incident involved no rain, a single response unit was sufficient.

Accordingly, in response to a current or ongoing incident, cognitive next action unit 135 is capable of receiving events indicating real time sensor data as well as weather information such as whether rain is present, wind speed, and temperature from cognitive engine 115. Cognitive next action unit 135 is capable of generating a recommendation based upon the amount of resources dispatched to the current incident and the data relating to number of units dispatched in prior incidents. For example, cognitive next action unit 135 is capable of determining that for a current incident involving rain, high winds, and high temperature where a single response unit is dispatched, a next action is to dispatch additional response units. In another example, cognitive next action unit 135 is capable of determining that for a current incident involving no rain, but high winds and high temperature, only a single response unit is likely needed. In that case, cognitive next action unit 135 is capable of generating a next action indicating that a second response unit that may have been dispatched should stand down until the incident is properly assessed by the first response unit dispatched.

Continuing with the above example, additional data may be obtained from data sources 160 and processed through cognitive engine 115. Cognitive engine 115 is capable of generating events based upon analysis of the additional data and providing the events to cognitive next action unit 135. For example, the additional data may include a social networking platform feed and transcribed 3-1-1 calls (e.g., non-emergency police calls). Additional real time sensor data may be continually received for the incident. Cognitive engine 115 may detect mentions of the word "gas" within posts of the social networking feed, calls indicating "gas" for locations at or about the location of the incident from the transcribed calls, and high heat and high temperature from the real time sensor data at the location of the incident. Further, one or more sensors may suddenly stop providing data. In that case, cognitive next action unit 135, in response to receiving the aforementioned data as events from cognitive engine 115, is capable of determining that a high probability of a gas explosion exists. Accordingly, cognitive next action unit 135 is capable of generating a next action indicating that the utility company should be contacted to turn off gas in the area of the incident.

In another example, cognitive engine 115 may determine that the real time sensor data indicates that carbon dioxide and smoke are present at a particular location. Cognitive engine 115 may also determine that radiation levels are increasing and that heat is increasing from the real time sensor data. In that case, cognitive incident reporter 110, in response to receiving this information from cognitive engine 115, determines that a hazmat incident is likely occurring or is likely to occur.

Continuing with the above example, consider the case where an incident is created in response to notification of the predicted incident. In that case, cognitive dispatch 125 is capable of utilizing weather data obtained from data collector 120 and provided through cognitive engine 115. The weather data may indicate high winds from the west. Cognitive dispatch 125, for example, may provide instructions for dispatching the hazmat team to a location that is away from the wind and to start evacuations in areas likely to be affected by the incident given the current wind speed and/or direction. Cognitive dispatch 125 further may provide evacuation routes that take into account the wind direction and/or speed and the location of the incident.

Other illustrative examples include, but are not limited to, providing a next action to fire fighters on their way to a fire incident that one or more fire hydrants in the vicinity of the incident have insufficient water pressure, e.g., as determined from fire hydrant sensor data. In that case, cognitive next action unit 135 is capable of notifying the fire fighters of the location of one or more alternative working fire hydrants based upon location of the fire incident and the location(s) of the working fire hydrants as determined from the fire hydrant sensor data.

One or more embodiments are directed to providing recommendations to first responders based on an analysis of sensor information (e.g., fire hydrant pressure, carbon dioxide sensors, weather, etc.). Methods, systems, and computer program products are adapted to provide real-time insight to first responders and cognitive recommendations to the first responders based on information from multiple sensors. The embodiments described herein are capable of comparing data obtained from a currently dispatched emergency response, e.g., an incident, and review the information along with information collected from previously dispatched emergency response(s) and corresponding sensor information to determine a recommendation of next actions. Based on the recommendations of next actions, an updated, e.g., optimized, dispatch of first responder resources can be recommended and provided.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method within a computer hardware system including a sensor gateway, a data collector, a cognitive engine, a cognitive reporter, and a cognitive dispatch, comprising:
   receiving, using a computer communication protocol and by the sensor gateway, real time sensor data from a plurality of sensors disposed external to the computer hardware system;
   aggregating, by the sensor gateway, the real time sensor data from the plurality of sensors and providing the aggregated real time sensor data to the cognitive engine;
   retrieving, by a data collector and in response to a request from the cognitive engine, comparison data from computer data sources using a universal resource locator (URL) that is specific to a data type being requested;
   generating, using the cognitive engine employing an artificial neural network, a predicted event by correlating the real time sensor data with historical data for a plurality of prior incidents retrieved by the data collector and including the comparison data;
   automatically creating, by the cognitive dispatch and based upon the predicted event, a dispatch message for a preliminary responder team;
   sending, by the cognitive dispatch and responsive to the cognitive incident reporter, the dispatch message by triggering a pushing messaging system to deliver the dispatch message to responder devices
   receiving, by the cognitive engine, additional information including information collected from the preliminary responding team and from the real time sensor data and the data sources; and
   determining, by the cognitive engine employing the artificial neural network, a recommended next action based upon the additional information, wherein
   the creating the dispatch message occurs prior to an emergency occurring.

2. The method of claim 1, wherein
the correlating determines a selected prior incident matching the real time sensor data, and
the recommended next action is determined from a next action taken for the selected prior incident.

3. The method of claim 1, further comprising:
analyzing a social networking platform feed to detect events correlated with the real time sensor data, wherein
the recommended next action is updated according to the events.

4. The method of claim 1, wherein
the recommended next action indicates a resource to dispatch.

5. The method of claim 4, wherein
the recommended next action indicates an amount of the resource to dispatch.

6. The method of claim 1, further comprising:
determining currently dispatched resources for an incident, wherein
the recommended next action is determined based upon the currently dispatched resources.

7. A computer-hardware system including a sensor gateway, a data collector, a cognitive engine, a cognitive reporter, and a cognitive dispatch, comprising:
   a processor configured to initiate executable operations including:
      aggregating, by the sensor gateway, the real time sensor data from the plurality of sensors and providing the aggregated real time sensor data to the cognitive engine;
      retrieving, by a data collector and in response to a request from the cognitive engine, comparison data from computer data sources using a universal resource locator (URL) that is specific to a data type being requested;
      generating, using the cognitive engine employing an artificial neural network, a predicted event by correlating the real time sensor data with historical data for a plurality of prior incidents retrieved by the data collector and including the comparison data;
      automatically creating, by the cognitive dispatch and based upon the predicted event, a dispatch message for a preliminary responder team;
      sending, by the cognitive dispatch and responsive to the cognitive incident reporter, the dispatch message by triggering a pushing messaging system to deliver the dispatch message to responder devices
      receiving, by the cognitive engine, additional information including information collected from the preliminary responding team and from the real time sensor data and the data sources; and
      determining, by the cognitive engine employing the artificial neural network, a recommended next action based upon the additional information, wherein the creating the dispatch message occurs prior to an emergency occurring.

8. The system of claim 7, wherein
the correlating determines a selected prior incident matching the real time sensor data, and
the recommended next action is determined from a next action taken for the selected prior incident.

9. The system of claim 7, wherein
the processor is configured to initiate executable operations further including:
analyzing a social networking platform feed to detect events correlated with the real time sensor data, wherein
the recommended next action is updated according to the events.

10. The system of claim 7, wherein
the recommended next action indicates a resource to dispatch.

11. The system of claim 10, wherein
the recommended next action indicates an amount of the resource to dispatch.

12. The system of claim 7, wherein
the processor is configured to initiate executable operations further including:
determining currently dispatched resources for an incident, wherein
the recommended next action is determined based upon the currently dispatched resources.

13. A computer program product, comprising:
a computer readable storage medium having program instructions embodied therewith,
the program instructions executable by a computer hardware system including a sensor gateway, a data collector, a cognitive engine, a cognitive reporter, and a cognitive dispatch to cause the computer hardware system to perform:
  receiving, using a computer communication protocol and by the sensor gateway, real time sensor data from a plurality of sensors disposed external to the computer hardware system;
  aggregating, by the sensor gateway, the real time sensor data from the plurality of sensors and providing the aggregated real time sensor data to the cognitive engine;
  retrieving, by a data collector and in response to a request from the cognitive engine, comparison data from computer data sources using a universal resource locator CURL) that is specific to a data type being requested;
  generating, using the cognitive engine employing an artificial neural network, a predicted event by correlating the real time sensor data with historical data for a plurality of prior incidents retrieved by the data collector and including the comparison data;
  automatically creating, by the cognitive dispatch and based upon the predicted event, a dispatch message for a preliminary responder team;
  sending, by the cognitive dispatch and responsive to the cognitive incident reporter, the dispatch message by triggering a pushing messaging system to deliver the dispatch message to responder devices
  receiving, by the cognitive engine, additional information including information collected from the preliminary responding team and from the real time sensor data and the data sources; and
  determining, by the cognitive engine employing the artificial neural network, a recommended next action based upon the additional information, wherein the creating the dispatch message occurs prior to an emergency occurring.

14. The computer program product of claim 13, wherein
the correlating determines a selected prior incident matching the real time sensor data, and
determining a plurality of candidate next actions from the operating procedure and selecting the recommended candidate next action is determined from the operating procedure that matches the a next action taken for the selected prior incident as the recommended next action.

15. The computer program product of claim 13, wherein
a social networking platform feed is analyzed to detect events correlated with the real time sensor data, and
the recommended next action is updated according to the events.

16. The computer program product of claim 13, wherein
the recommended next action indicates a resource to dispatch.

17. The computer program product of claim 16, wherein
the recommended next action indicates an amount of the resource to dispatch.

18. The computer program product of claim 13, wherein
determining currently dispatched resources are determined for an incident, and
the recommended next action is determined based upon the currently dispatched resources.

* * * * *